United States Patent [19]

Carlson et al.

[11] Patent Number: 4,577,340

[45] Date of Patent: Mar. 18, 1986

[54] HIGH VACUUM ROTATING ANODE X-RAY TUBE

[75] Inventors: Roland W. Carlson, Lyndhurst; Edward A. Blaskis, Hudson, both of Ohio

[73] Assignee: Technicare Corporation, Solon, Ohio

[21] Appl. No.: 533,706

[22] Filed: Sep. 19, 1983

[51] Int. Cl.[4] .......... H01J 5/30; F16J 9/00; F16J 15/00; E21B 33/00

[52] U.S. Cl. .......... 378/132; 378/125; 378/4; 277/9.5; 277/80; 277/135; 277/25

[58] Field of Search .......... 378/125, 130–133, 378/144; 277/9.5, 25, 80, 135

[56] References Cited

U.S. PATENT DOCUMENTS

| | | | |
|---|---|---|---|
| 2,329,317 | 9/1943 | Atlee | 252/629 |
| 2,754,168 | 7/1956 | Atlee | 445/28 |
| 3,546,511 | 12/1970 | Shimula | 378/130 |
| 4,066,310 | 1/1978 | Palac | 445/45 |
| 4,094,563 | 6/1978 | Simms et al. | 445/33 |
| 4,163,901 | 8/1979 | Azam et al. | 378/123 |
| 4,165,472 | 8/1979 | Wittry | 378/130 |
| 4,289,317 | 9/1981 | Kuc | 277/1 |
| 4,309,637 | 1/1982 | Fetter | 378/130 |
| 4,322,624 | 3/1982 | Cornelissen et al. | 378/132 |
| 4,380,356 | 4/1983 | Weghaupt | 277/80 |
| 4,392,238 | 7/1983 | Lersmacher et al. | 378/144 |

FOREIGN PATENT DOCUMENTS

WO82/03522 10/1982 PCT Int'l Appl. .

OTHER PUBLICATIONS

Van Nostrand's Scientific Encyclopedia, Fifth Edition, 1976.

"Magnetic-Fluid Seals" By Raj, et al. *Laser Focus Magazine,* Apr. 1979, pp. 56–63.

"Mass Spectrometric Studies Of Material Evolution From Magnetic Liquid Seals" By Raj, et al. *Review Of Scientific Instruments,* vol. 51, No. 10, Oct. 1980.

"High Brillance X-Ray Sources" By Yoshimatsu, et al. *Topics In Applied Physics,* vol. 22, X-Ray Optics, Edited by H. J. Queisser, Published By Springer Verlag, 1977, pp. 9–33.

Scientific Instruments—A 5 KW. Crystallographic X-ray Tube With A Rotating Anode—By A. Taylor, PH.D., F.I.M., F. Inst.P., The Mond Nickel Co Ltd., Birmingham—vol. 26, Jul. 1949. pp. 225–229.

The Review Of Scientific Instruments—vol. 27, Number 9—Sep., 1956—Improved Demountable Crystallograhic-Rotating Anode X-Ray Tube—By A. Taylor—pp. 257–259.

Philips Technical Review—vol. 19—An X-Ray Diffraction Tube With Rotating Anode For 10 KW Continuous Loading—W. J. H. Beekman, A. Verhoeff And H. W. van der Voorn—pp. 314–317.

Advances In X-Ray Analysis—vol. 9—High-Intensity Rotating Anode X-Ray Tubes—A. Taylor—pp. 194–200.

"Ferrofluidic Sealing Capabilities", Published By Ferrofluidics Corporation, 40 Simon Street, Nashua, N.H. 03061

*Primary Examiner*—Craig E. Church
*Assistant Examiner*—Charles Wieland
*Attorney, Agent, or Firm*—Audley A. Ciamporcero, Jr.

[57] ABSTRACT

An all metal and ceramic high vacuum rotary anode X-ray tube adapted for mounting on a gantry of a rotational type CT scanner. The evacuated region where X-rays are generated is maintained at about $10^{-7}$ Torr. Vacuum sealing about the rotating shaft of the anode is provided by a magnetic fluid. No bearings are utilized within the evacuated region. Large, long wearing ball bearings that transmit rotation through the vacuum seal are provided about the shaft outside of the high vacuum region where conventional lubricants may be applied. Circulating coolant is applied internally through the anode assuring continual operation of the tube without the need for frequent cool-down waits.

3 Claims, 7 Drawing Figures

HIGH VACUUM ROTATING ANODE X-RAY TUBE

FIELD OF THE INVENTION

The present invention relates to rotating anode X-ray tubes and, in particular, to such tubes having a high vacuum sealed by a magnetic fluid and specially designed for applications requiring tube mobility such as in rotational CT scanners.

BACKGROUND OF THE INVENTION

A major factor in the usefulness of a CT scanner is the speed and rapidity with which it performs its scanning function. Although it is now commonplace to perform a scan of a single transaxial cross-section of a patient's internal organs in two seconds or less, a complete study of a volume of interest that includes on the order of 20 high energy scans typically consumes 30 minutes or more. The vast portion of this is idle time to permit the X-ray tube to cool down between scans to avoid damaging the tube. Even with the usual precautions, however, X-ray tubes fail frequently in heavy use, resulting in temporary shut-down of the scanner.

As is well known, X-rays may be generated in a vacuum tube that comprises an anode and a cathode generally referred to as an electron gun which in turn includes a heatable tungsten filament connected to a high voltage source adapted for emitting a high energy beam of accelerated electrons. The anode is in the form of a metal target displaced a short distance from the cathode to stop the accelerated electron beam. The impact, through a relatively inefficient process, generates X-rays. The X-rays, also known as Bremsstrahlung or braking radiation, are produced by the deceleration of the electrons as they pass near a tungsten nucleus. Since typically less than one percent of the total energy of the accelerated electrons is converted to electromagnetic radiation, the bulk of the energy created by the high voltage source on the cathode is converted to thermal energy at the target area.

To minimize the debilitating effects of this resultant heat effect in conventional, fixed anode X-ray tubes, the anode is generally provided with a through flow of cooling fluid to help dissipate the heat. Nonetheless, the generation of considerable heat at a fixed focal spot creates gross limitations on the energy output capacity of the tube as well as on its limits of continuous operability.

A significant improvement was achieved by the rotating anode X-ray tube which expanded the focal spot on the target from a point to a circle. At first, such rotating anode tubes relied on radiation for heat dissipation; however, this too, quickly proved to be limiting. Although efforts for providing through flow cooling were suggested, such as for example, by Fetter in U.S. Pat. No. 4,309,637, rotating type tubes created a new set of problems. As described in the Fetter patent, the evacuated region of the tube must be sealed to maintain the necessary vacuum. Since the shaft of the anode must be provided with mechanical means for rotation, bearings must be provided within the sealed region necessitating the need to use relatively small bearings devoid of normal lubrication. This has resulted in a new failure mode for such tubes.

These problems are particularly exacerbated when the tube is intended as a mobile X-ray source such as in a rotational type CT scanner where it is impractical to utilize a mechanical pump for continuous maintenance of a high vacuum region. While the invention will be described particularly in connection with rotational CT scanner application, it will be appreciated that the X-ray tube is useful in a variety of X-ray settings, such as, for example, X-ray diffraction applications and digital X-ray imaging.

SUMMARY OF THE INVENTION

We have invented a high vacuum rotating anode mobile X-ray tube which utilizes a magnetic fluid vacuum seal about the rotating shaft of the anode and thereby avoids the need for ball bearings in the evacuated region. The X-ray tube disclosed herein is provided with three separate, continuous, flow through liquid cooling paths that permit high patient throughput when mounted on a rotational type CT scanner.

In a preferred embodiment, our X-ray tube comprises a water cooled anode adapted for rotation about an axis therethrough, the anode having a two-sided disc-shaped rotor including an annular target region on one side and a rotatable shaft extending from the other; a housing enclosing the rotor and defining therewithin a region of high vacuum which is maintained at or about $10^{-7}$ Torr for an extended period of time; an annular compressed temporary static seal embedded in the rotor within the high vacuum region; an electron gun fixedly mounted within the housing, the electron gun adapted and configured to emit a beam of electrons to be incident on the target of the rotor; a static vacuum seal about the electron gun where the gun is mounted within the housing; a rotary vacuum seal disposed about the shaft of the anode in a manner permitting rotation of the shaft while maintaining the high vacuum in the evacuated region; conventionally lubricated ball bearings disposed about the shaft outside of the evacuated region for transmitting rotary motion of the shaft through the liquid vacuum seal and with no bearings within the evacuated region; and a window formed on the housing for permitting emission from the evacuated region of X-rays generated by the incidence of the high energy electrons on the target region of the rotor.

The sealing means includes a pair of annular pole pieces separated by a plurality of magnets, each pole piece including a plurality of parallel interior grooves wherein the region between adjacent pairs of grooves defining circular gaps between the pole piece and the shaft wherein magnetic fluid is focused for creation of a vacuum seal. The tube also comprises means connected to the region intermediate the two pole pieces for maintaining the pressure at said region at or below approximately 100 millibars.

DETAILED DESCRIPTION

Figure 3:
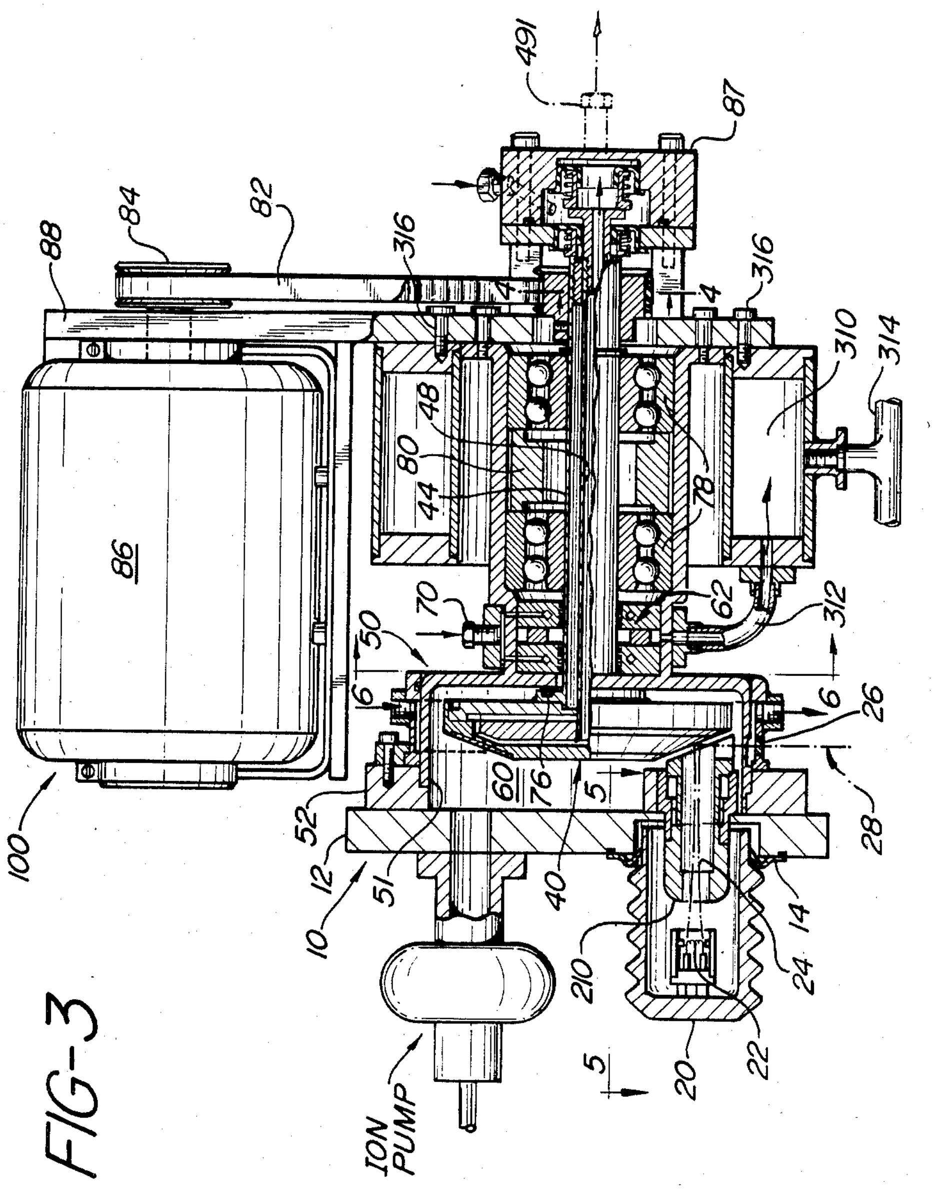
FIG. 3 is an assembly drawing partially in section of the X-ray tube of FIG. 1 including its mounting assembly.

Referring first to FIG. 3, there is shown a rotary anode X-ray generating vacuum tube referred to generally as 10 together with a drive motor assembly referred to generally as 100. The drive motor assembly provides the necessary rotation of the tube as will be described in detail below. The tube 10 and the assembly 100 are adapted for mounting on a gantry of a rotating type CT scanner (not shown). The X-ray tube 10 comprises an electron gun 20 connected to a high voltage source (not shown) which serves as the cathode of the vacuum tube and a rotating anode assembly 40 which will be described below with reference to FIG. 1.

Figure 1:
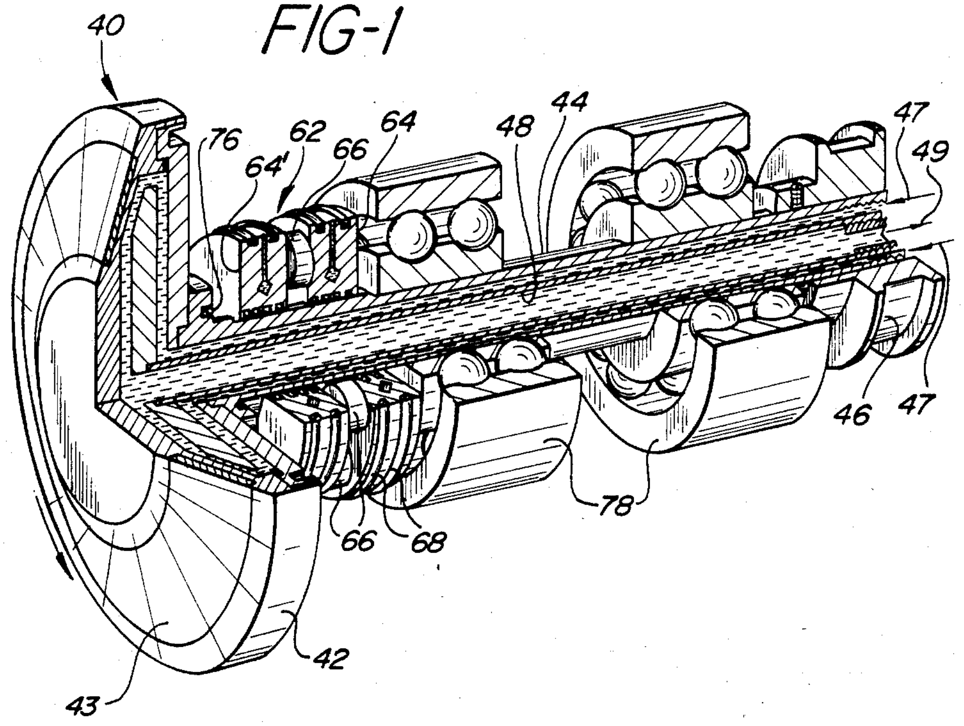
FIG. 1 is a perspective view of portions of the inventive X-ray tube, partially in section.

As shown in FIG. 1, the rotating anode assembly 40 includes a rotatable generally disc-shaped stainless steel rotor 42 and stainless steel shaft 44. The rotor 42 has a beveled frontal portion including an annular hardened portion 43, preferably plasma sprayed tungsten, which serves as the target. The function of target 43 is to decelerate the high energy electrons emitted by the electron gun 20 to thereby generate X-rays.

Figure 2:
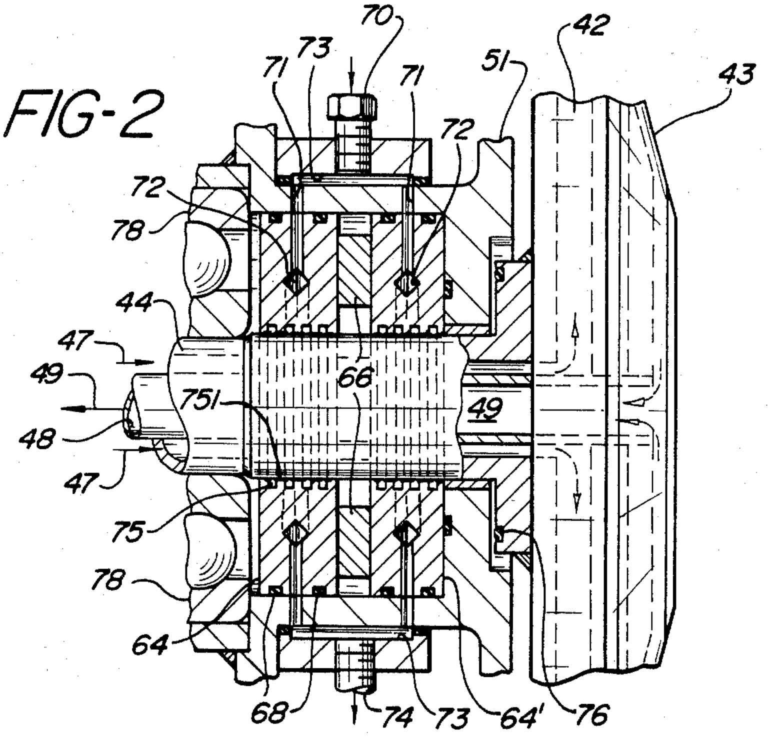
FIG. 2 is an enlarged sectional view of a portion of the tube of FIG. 1 illustrating in greater detail a magnetic seal assembly.

Extending away from the rotor 42 is the shaft 44 whose remote end is surrounded by a drive pulley 46 for connection to the motor drive assembly 100. The shaft 44 includes a concentrically disposed hollow internal shaft 48 as best illustrated in FIG. 2. The region between the exterior of the internal shaft 48 and the interior of shaft 44 defines an annular passageway 47 for the introduction of a coolant such as water, into the anode assembly 40. Passageway 47 extends the length of shaft 44 to the interior of the rotor 42. The cooling water is directed radially outward in the interior of the rotor 42 from the interface of the rotor and shaft as shown in FIG. 1 and is routed around to internal portions of rotary target 43. As a result of the considerable heat generated at the target, the water is heated as it flows past the target. The heated water then routs through the interior of internal shaft 48 which defines a cylindrical exiting passageway 49 for the discharge of the heated fluid. The remote ends of the two shafts are threadably engaged to ensure retention of the internal shaft 48 in concentric relationship inside shaft 44.

As is well known, the region between the target of the anode and the electron gun or cathode of the X-ray tube must be maintained in a high vacuum defined by a stainless steel housing 50 which includes base plate 12, sleeve 51, and main flange 52. As is shown in FIG. 3, electron gun 20 is mounted through an opening in stainless steel base plate 12. Sleeve 51 which is attached to base plate 12 by means of main flange 52 serves as an enclosure for rotor 42 and together with base plate 12 defines a region 60 of high vacuum, i.e., on the order of $10^{-7}$ Torr. A small ion pump such as one made by Varian Associates, Palo Alto, CA is mounted within base plate 12 and serves as a getter to help maintain the high vacuum. Since electron gun 20 is mounted in fixed relation within base plate 12, an annular static seal 14 provides the necessary sealing therebetween. The anode assembly 40, however, requires rotation and, hence, creates a far more diffulct vacuum sealing problem. Proper sealing between the evacuated region 60 and the shaft 44 of the anode assembly is provided by a magnetic seal assembly 62 which utilizes a magnetic or ferrofluidic seal to provide coaxial liquid sealing about the shaft 44. Magnetic fluid as well as magnetic seal assemblies are available from the Ferrofluidics Corporation of Nashua, N.H. 031061.

The magnetic ferrofluidic seal assembly 62 is shown in place disposed about shaft 44 in the sectional detailed illustration of FIG. 2. The ferrofluidic seal 62 includes a pair of annular pole pieces 64, 64' disposed about the shaft 44 and separated from each other by a plurality of magnets 66 sandwiched therebetween and arranged in a circle about the shaft. The magnetic pieces 66 are axially polarized. Magnetic fluid is placed in the gap beteen the inner surfaces of the stationary pole pieces 64, 64' and the outer surface of the rotary shaft 44. In the presence of a magnetic field, the ferrofluid assumes the shape of a liquid O-ring to completely fill the gap. Static sealing between outer portions of the two pole pieces and the interior of housing 50 is provided by means of elastomeric O-rings 68, two embedded in each pole piece.

Cooling of the magnetic seal assembly 62 is provided by a coolant such as water that is introduced into the assembly at the cooling in port 70. Port 70 is in fluid communicating relationship by means of a first channel 71 with a pair of annular openings 72, diamond shape in cross-section, one in each pole piece. To permit discharge of the heated coolant, there is provided another channel 73, diametrically opposed to the first channel 71, which collects the heated liquid for discharge through cooling out port 74.

The interior of each pole piece is provided with a plurality of parallel annular grooves 75 wherein the high regions 751 adjacent said grooves represent the closest distance between the shaft and the pole pieces and hence, define the region where the ferrofluid is focused. Each such annular ring of ferrofluid serves as an independent seal in the system. In accordance with a preferred embodiment, the pressure between each adjacent pair of annular magnetic seals in the pole piece 64', adjacent said evacuated region 60, is at approximately 0 psi, while the pressure gradient across the other pole piece 64 rises incrementally from 0 psi intermediate the two pole pieces 64, 64' to 15 psi or atmospheric pressure (approximately 760 Torr) on the other side. FIG. 2 also illustrates an annular temporary static seal 76 disposed in the rotor and spaced apart from sleeve 51 of housing 50. Temporary seal 76 is a hollow, metal O-ring that can withstand temperatures in excess of 350° C. It serves no purpose in the operation of the X-ray tube, but is used to seal the evacuated region during a bake-out procedure to assure a high vacuum. This is accomplished before the magnetic seal assembly including magnetic fluid is installed. Assembly of the tube is the subject of a separate, copending, application, Ser. No. 533,704; filed Sept. 19, 1983, now U.S. Pat. No. 4,501,566, issued Feb. 26, 1985.

With the aid of the magnetic fluid, the anode can be rotated in a fashion that permits maintenance of the high vacuum in the evacuated region 60 without the need for bearings inside the high vacuum. Thus, as can be seen in FIG. 3, there are no bearings in the evacuated region 60. A pair of high durability bearings 78 separated by a spacer 80 are disposed about the shaft 44 outside of the evacuated region where they are provided with conventional lubricants, assuring long life. Adjacent bearings 78 is the drive pulley 46. The drive pulley is rotated by a belt 82 which connects to a motor pulley 84 that in turn is driven by a variable speed motor 86 of motor drive assembly 100. The motor drive assembly is mounted on a mounting plate 88 which also supports the X-ray tube 10 for rotation on a gantry (not shown) of a rotational type CT scanner.

Figure 4:
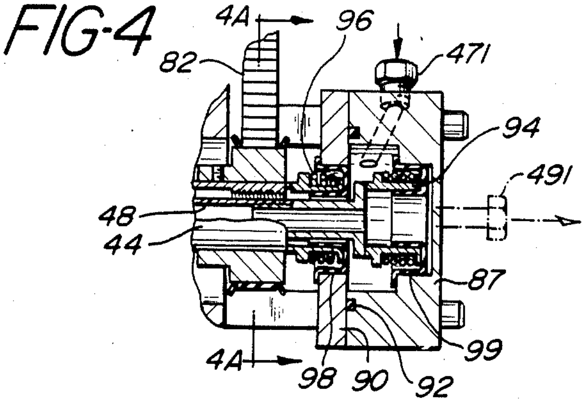
FIG. 4 is a section taken along line 4—4 of FIG. 3.
Figure 4A:
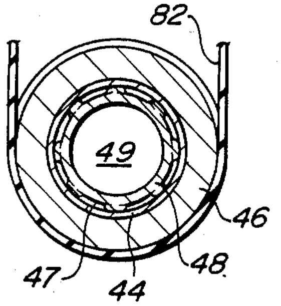
FIG. 4A is a section taken along line 4A—4A of FIG. 4.

The belt 82 is also shown in FIG. 4A. This end view also illustrates the threadable engagement of shaft 44 with internal shaft 48. The annular space between the two shafts 44, 48 defines the cold water inlet passageway 47 that serves to cool the anode 40. Also shown is the cylindrical exiting hot water passageway 49. The engagement of the two shafts 44, 48 is shown in greater detail in FIG. 4. The coolant is introduced into inlet passageway 47 via input port 471 while the heated liquid exits the anode from cylindrical passageway 49 through exit port 491. This is shown in phantom in FIG. 4 since port 491 is out of the plane of the FIG. 4 illustration. The anode assembly 40 terminates in an end piece 87 which is bolted to end plate 90. Sealing between end piece 87 and end plate 90 is provided by O-ring 92. To maintain the desired concentric relationship between shaft 44 and internal shaft 48, internal shaft 48 is threadably engaged within the interior of the cylindrical opening of shaft 44 and secured therein by means of spring loaded assembly 94. Likewise, the shaft 44 is also provided with a spring loaded assembly 96 at its remote end biased against end plate 90. Annular water seals 98, 99 are provided for shaft 44 and internal shaft 48, respectively.

Figure 5:
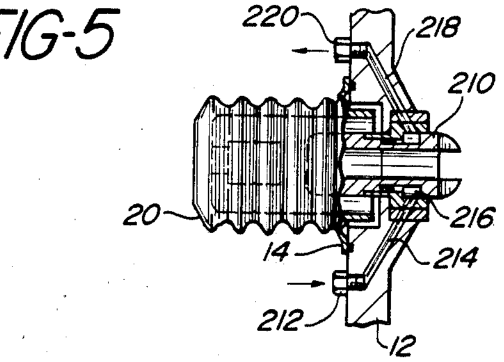
FIG. 5 is a section taken along line 5—5 of FIG. 3.

A third coolant circuit is provided in connection with cathode 20 which will be described in detail below, making reference to FIGS. 3 and 5. Cathode 20 includes a filament 22 which in conventional fashion emits high energy electrons which accelerate along path 24 on their way to the target 43 of the rotor 42. As was stated earlier, only a small percentage of the electrons that are decelerated by the target generate X-rays. These exit the tube through a window 26 along path 28. The window 26 is simply a thinned out portion of the stainless steel housing 50 or more preferably, made of beryllium. As discussed in U.S. Pat. No. 4,309,637 to Fetter, there will be some scatter of secondary electrons emitted at the region of the incidence of the electron beam. To minimize the impact of this scatter, a hood 210 is provided around the target region to collect the scattered electrons. It has been found that hood 210 quickly heats up to high temperatures and for this reason a separate cooling circuit, as shown in FIG. 5, is provided. A cold water inlet 212 is mounted in the base plate 12 which connects to the hood 210 by means of passageway 214. The entering water is routed around the hood through annular opening 216 and the heated water exits through passageway 218 through base plate 12 and eventually out through exit port 220. Thus, the X-ray tube described herein is provided with three separate water circuits: one for the magnetic seal assembly 62, another for the rotating anode assembly 40 and finally, a third, for the hood 210.

Since the entire unit is mounted on the gantry of a CT scanner, it is important that the tube require minimum service. To maintain long use from the tube, it is essential that the evacuated region 60 be maintained at the requisite high vacuum. In testing, it has been found that pressure builds up across each vacuum seal; however, the region between the two pole pieces must be maintained at a pressure below 100 millibars ($\approx$75 mm Hg or about 75 Torr). To assure that this condition is maintained over a substantial period of time, a donut-shaped ballast volume 310 is fitted about shaft 44 in concentric relationship with bearings 78. The ballast volume is in pressure communicating relationship with the magnetic seal assembly 62 via connector tube 312. The ballast volume is also provided with a T-fitting 314 one stem of which is connected to a gauge (not shown) for reading the internal pressure in the volume while the other stem is connected to a bleed off valve (also not shown) for periodically relieving the pressure that builds up inside the volume. With the augmented volume provided by ballast volume 310, the pressure intermediate the two pole pieces 64, 64' is maintained below the 100 millibar level for approximately one month before the ballast volume needs to be valved.

Figure 6:
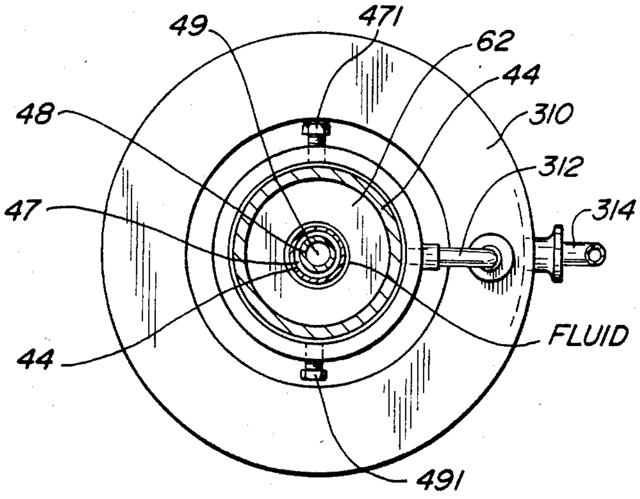
FIG. 6 is a section taken along line 6—6 of FIG. 3.

Although the T-fitting 314 is illustrated in FIG. 3, it is actually set off by 90 degrees from the plane of FIG. 3. The proper orientation of the T-fitting 314 is depicted in FIG. 6. The ballast volume 310 is connected to mounting plate 88 by a series of bolts 316 disposed about a circle defined by the annular shape of the volume.

We claim:

1. In a CT scanner, a high voltage high vacuum rotating anode X-ray tube comprising:

(a) an anode adapted for rotation about an axis therethrough, the anode having a rotor and a shaft extending therefrom;

(b) a housing enclosing portions of said rotor and defining therewithin an evacuated region of high vacuum;

(c) an electron gun fixedly mounted through said housing, said electron gun adapted and configured to emit a beam of electrons to be incident in said region on the rotor of said anode for generating X-rays;

(d) fluid magnetic sealing means disposed about the shaft of said anode for fluidically sealing the high vacuum in said region while permittting rotation of said anode;

(e) bearing means disposed about said shaft outside of said high vacuum region for transmitting rotary motion through said sealing means;

(f) window means formed on said housing for permitting transmission of X-rays through said housing; and (g) an annular static seal disposed on said rotor within the high vacuum region;

(h) wherein said magnetic sealing means comprises a pair of annular pole pieces separated by a plurality of magnets, said pole pieces fitted about the shaft of said anode, with vacuum sealing between said pole pieces and the shaft provided by a magnetic fluid and further comprising means for maintaining the pressure imtermediate the two pole pieces at a relatively low pressure of or below approximately 100 millibars.

2. A rotating anode X-ray tube according to claim 1 wherein said means for maintaining low pressure intermediate the two pole pieces comprises a ballast volume disposed about at least portions of said shaft and connected to said region between the two pole pieces of the magnetic seal assembly.

3. Appartus as described in claim 1 and further comprising an ion pump for maintenance of vacuum within said high vacuum region.

* * * * *